United States Patent [19]
Grobler

[11] 4,176,058
[45] Nov. 27, 1979

[54] METHOD MEANS FOR DE-SILTING WATER

[76] Inventor: Jacobus J. Grobler, Sophia St. 25, Risiville, Vereeniging 1930, Transvaal, South Africa

[21] Appl. No.: 653,302

[22] Filed: Jan. 29, 1976

Related U.S. Application Data

[63] Continuation of Ser. No. 517,526, Oct. 24, 1974, abandoned.

[51] Int. Cl.$^2$ .......................... B01D 21/01; C02B 1/20
[52] U.S. Cl. ........................................ 210/44; 210/51; 210/53; 210/54
[58] Field of Search ............................. 210/44, 51–54, 210/170, 221

[56] References Cited
U.S. PATENT DOCUMENTS

| | | | |
|---|---|---|---|
| 2,302,338 | 11/1942 | Moeller et al. | 210/44 |
| 3,138,550 | 6/1964 | Woolery | 210/44 |
| 3,256,140 | 6/1966 | Poschmann | 210/44 |
| 3,377,274 | 4/1968 | Burke et al. | 210/53 |
| 3,470,091 | 9/1969 | Budd et al. | 210/170 |
| 3,479,282 | 11/1969 | Chamot et al. | 210/54 |
| 3,707,464 | 12/1972 | Burns et al. | 210/44 |

*Primary Examiner*—Charles N. Hart
*Assistant Examiner*—David R. Sadowski

[57] ABSTRACT

The invention relates to a method and a means for de-silting water. The settling of silt in inland lakes and dams considerably reduce the effective life span of such lakes and dams, and also cause a substantial loss of fertility of the agricultural lands from which the silt originates. The invention provides a method for removing silt particles from water by first agglomerating the silt particles into larger size particles, imparting hydrophobic properties to the larger size particles and floating the same to the surface, and removing the floated matter. The invention also provides an apparatus for removing silt particles from water which includes means for feeding into and mixing with the water chemicals selected for agglomerating the silt particles and converting them into larger size hydrophobic particles, means for bubbling air through the water to float the larger size particles to the surface, and means for removing the floated matter.

22 Claims, 8 Drawing Figures

METHOD MEANS FOR DE-SILTING WATER

This is a continuation of application Ser. No. 517,526, filed Oct. 24, 1974 now abandoned.

BACKGROUND OF THE INVENTION

This invention relates to a method and to means for de-silting water. More particularly, the invention concerns a method for removing silt from flowing as well as static bodies of water, and to means for carrying out the method.

It is known that the effective life span of inland lakes and dams is considerably reduced by the inflow into and settling in such dams of large quantities of silt, i.e. material of an earthy, mainly inorganic nature carried in finely divided form by flowing water and deposited to form fine-grained sediments. Hitherto it has been exceedingly difficult, in fact all but impossible, to prevent the inflow of silt into lakes and dams and the build-up of voluminous silt deposits in such lakes and dams.

It is an object of the invention to provide a method and means for de-silting water so as to provide water of improved purity for domestic, industrial or other use.

It is a further object to provide a method and means for removing silt from the water flowing into inland lakes and dams, and so to prevent or at least decrease the deposition of voluminous quantities of silt in such lakes and dams, and thus to extend the effective life span of such lakes and dams.

Another important object of the invention is to provide a method and means for recovering the silt from silt-containing water for further use, such as for agricultural or horticultural purposes. In the context of silt recovery, it is known that the silt in rivers is of great agricultural value, and it has been estimated that the "fertility" lost annually through silt loss from agricultural lands is equivalent to substantial amounts of fertilizer.

BRIEF DESCRIPTION OF THE INVENTION

According to the invention, there is provided a method for removing silt particles from water which comprises A. an agglomeration step whereby the silt particles are formed into agglomerated particles of substantially larger size;

B. a hydrophobic treatment step whereby the agglomerated particles are imparted with hydrophobic properties;

C. a flotation step whereby the agglomerated particles are floated to the surface of the water and D. a removal step for removing the floated agglomerated particles.

The invention thus envisages the removal of silt from water by flocculating or agglomerating the (usually amorphous) silt particles to form a flocked or agglomerated material, the particles of which have a size distribution within limits of substantially larger dimensions, and by removing such agglomerated particles by flotation.

Preferably the agglomeration step to agglomerate the silt particles and the hydrophobic treatment step for imparting hydrophobic properties are carried out simultaneously. Furthermore, the flotation step is preferably carried out with the aid of air bubbled through the water, while the floated agglomerated particles may conveniently be removed by skimming.

The method is preferably applied to a flowing stream of water, preferably a natural river or stream of water which would include a canalised natural stream, or alternatively a stream artificially drawn from a static body of water. In practice, it is preferred that the method be carried out at a locality stream upward of a water storage dam.

The invention envisages also the means for carrying out the invention. Thus there is provided an apparatus for removing silt particles from water which comprises, in and/or operatively associated with a de-silting space suitable to contain the water to be de-silted and arranged to be fed from a body of water to be de-silted, A. means adapted to feed into and intimately mix with the water chemicals suitable for agglomerating the silt particles and forming them into agglomerated particles of substantially larger size;

B. means adapted to feed into and intimately mix with the water chemicals suitable for imparting hydrophobic properties to the agglomerated silt particles;

C. means adapted to bubble air through the water so as to cause the agglomerated hydrophobic silt particles to float to the surface of the water; and D. means for removing the floated silt particles from the water surface.

Again, as in the case of the method described above, the means (A) for feeding the agglomerating chemicals and the means (B) for feeding the hydrophobic treatment chemicals may advantageously be combined, and may be provided in the form of combination feed means adapted to feed and mix agglomerating and hydrophobic treatment chemicals.

When installing a plant for operation in practice, it is usually convenient to provide the apparatus within a river or stream in a position upstream of the inlet of a water storage dam, so that the aforesaid de-silting space may be constituted by a section of the river or stream bed. For the sake of convenience, that section or sections of the river or stream bed which constitutes the de-silting space may be canalised. Such section may also be dammed up and provided with means for maintaining a constant water level therein.

DESCRIPTION OF THE DRAWINGS

Further below some apparatus in accordance with the invention will be further exemplified with reference to the accompanying drawings. In the drawings.

DESCRIPTION OF PREFERRED EMBODIMENTS

A preferred embodiment of the method comprises intimately mixing into the water of a river or stream a suitable concentration of suitably selected chemicals to attain agglomeration of the silt particles and to impart hydrophobic properties to the agglomerated particles; bubbling air through the water at a locality downstream of the mixing locality to achieve flotation of the agglomerated particles; and skimming of the floated particles at a locality downstream of the flotation locality.

In applying the invention in practice, such reagents should be selected to carry out the steps of the method that contamination of the water reserves treated with substances harmful for the subsequent use of such water would be avoided. In this context, "contamination" relates to undesired qualities of the water as regards both humans and animals, as well as regards water and plant life. For example, it would be advantageous to select such reagents which could be broken down biologically, and/or to select such reagents which in combination would render one another harmless; and/or to select such reagents which would tend to adhere to the agglomerated silt material formed, so as to be removed together with the agglomerated material. Furthermore, the lowest possible reagent concentration which would still achieve the purposes of the invention should, of course, be utilised. Because silt in natural water is usually composed of a considerable variety of mineralogical species, largely amorphous and inorganic, it is usually desirable to employ reagents which are non-specific in that respect, and which are thus able to remove substantially all or at least a major proportion of mineral species suspended as silt in the water.

According to a further feature of the invention, the concentration of chemicals should be selected in accordance with the silt-loading of the water. Thus, the concentration of the chemicals may e.g. be adapted to reduce the silt-loading of the water to a predetermined level, which, in practice, need not amount to complete removal. To this end, the silt-loading of the water may be measured continuously or intermittently and the concentration adjusted accordingly.

Although the method of the invention may in theory be adapted to provide for the various variables likely to be encountered in practice, such as the rate of water flow, the silt-loading per unit volume of water, etc., namely by adjusting the concentrations of the chemicals, it should be noted that the adjustment need not provide for extreme cases, such as excessive floods. Thus, at the locality where the method is to be carried out, provision may be made for a portion of the water flow to by-pass the treatment area, so that the method will be carried out on only a portion of the total flow of water. The desirable relative rates of water flow through the by-pass and treatment areas may be determined beforehand, e.g. with reference to average flow rates and silt-loading, and desirable levels of silt-removal.

It has been found that the amorphous silt particles may effectively be agglomerated by treatment with a flocculating agent including a medium or high molecular weight polyacrylic amide, preferably a cationic copolymer of polyacrylic amide. Furthermore, the agglomerated silt particles may be rendered hydrophobic by treatment with an agent including an unsaturated fatty acid, more particularly of the oleic acid series, preferably oleic acid.

It has further been found that the best results may be obtained if the flocculation is carried out simultaneously with the treatment to impart a hydrophobic character to the agglomerated particles. To this end the flocculating agent may advantageously be combined with the agent for imparting the hydrophobic character to the agglomerated particles, and the silt-containing water treated with this combined reagent. What is usually preferred, is a reagent or reagent combination, preferably non-specific within the range of major mineral species occurring in silt, which combines flocculating and hydrophobic properties. This combination of properties is preferably present in a single molecule of a reagent or in an intimate association of molecules of different reagents, e.g. held together by v.d. Waal forces. This may be achieved by the presence in such molecules or intimate association of the molecules, of a flocculating molecular component, usually of macromolecular size, preferably of polymeric structure, and hydrophobic groups, e.g. aliphatic hydrocarbon chains, such as the aliphatic chain portion of an unsaturated fatty acid, e.g. of the type commonly employed in ore flotation. A typical such acid would be oleic acid. For example, the aforesaid cationic copolymer of polyacrylic amide and the oleic acid may be introduced into a suitable volume of water and stirred with a high speed rotary stirrer to provide a stable emulsion, with which the silt-containing water may then be treated to achieve flocculation of the silt particles to form an agglomerated material having a hydrophobic character.

Thereupon compressed air may be bubbled through the water to achieve flotation of the agglomerated material. The latter may then be removed, if desired for further treatment and use. The above use of high speed agitation and the subjecting of the polyacrylic amide to shear forces is quite contrary to the normal recommended manner of employing this flocculating agent, because the shear forces are known to break down the polymer. It is a surprising and unexpected result that such treatment in the presence of substances such as unsaturated fatty acids leads to a product having outstanding properties for the purposes of the present invention. Surprisingly, the resulting reagent in addition to its flocculating and hydrophobic property, also has foaming properties.

Although the applicant does not wish to be bound by any theoretical explanation, it is believed that such effective simultaneous flocculation and imparting of hydrophobic qualities may take place in practice because the cationic copolymer is degraded to some extent by the quick stirring and reacts with the unsaturated bond of the oleic acid to form a compound one part of which acts as a flocculating agent, and the other part of which renders the floc so formed hydrophobic.

One example of a cationic copolymer which may be used in accordance with the invention, is the substance available commercially under the code name "Hoe E 1727" and manufactured by Hoechst AG. The oleic acid which may be used in accordance with the invention is commercially available as "Oleic acid 6677 special flotation grade" manufactured by S & CI Transvaal (Pty) Ltd., a South African company.

According to a further feature of the invention, the reagent for treating silt-containing water may include also a high protein substance, such as the substance available commercially under the name "Protease- Hoechst 1549/1" and manufactured by Hoechst AG. Although the chemical explanation of the activity of the high protein substance is not quite clear to the applicant, the applicant has found by experiment that its presence improves the effectiveness of the de-silting reagent.

According to a further feature of the invention, a polyalkyleneimine, preferably a high molecular weight polyethylenimine, may advantageously be used as a flocculant to effect the agglomeration of the silt particles. It has been found that polyethylenimine is particularly effective when used in combination with a polyacrylic amide flocculant, an unsaturated fatty acid such as oleic acid, and a high protein substance such as "Protease-Hoechst 1549/1." Thus, a de-silting reagent including a polyacrylic amide, oleic acid, and a high protein substance, may advantageously include as a further ingredient a polyethylenimine, for example the substance commercially available under the code name "PEI 1000" and manufactured by Dow Chemical Africa (Pty) Ltd.

Another reagent which was found particularly effective, preferably in combination with the aforesaid chemicals, is a flocculant, the molecule of which consists of polyacrylic amide polymer blocks linked together by acrylic acid salt groups, preferably sodium acrylate groups. Thus, a de-silting reagent including a cationic copolymer of polyacrylic amide and oleic acid, may include as further ingredients the substance commercially available as "Dow Seperan AP 273" manufactured by Dow Chemical Corporation, and an alkane sulphonate such as the substance commercially available as "HOECHST 1175" manufactured by Hoechst AG. It has been found by way of experiment that these substances are of particular advantage for the removal of "difficult" silt particles; i.e. silt particles which are difficult to flocculate and flotate in accordance with the invention.

It is furthermore envisaged to modify for the purposes of the invention polyacrylic amide—acrylic acid salt—copolymers such as aforesaid (e.g. the aforesaid substance AP273) by replacing the sodium or other cation with a hydrophobic group, e.g. by condensation reaction in a manner known per se.

It should be understood that the relative quantities of the various agents may vary in practice, depending upon the properties of the silt-containing water to be treated in each case. The origin and nature of the slit as well as the quantity of silt per unit volume of water would influence the relative quantities of the various agents to be used. To achieve optimum results, the effective quantities should be determined empirically in each case, the lowest effective concentrations of the reagents resulting in satisfactory silt-removal preferably being selected in order to avoid undue contamination of the final product. In each case, the relative quantities should be so selected that maximum de-silting will take place with minimum contamination. By such empirical determination it is possible to allow for local variations and variations in time with regard to degree and nature of silt-loading of the water.

The aforesaid concepts would include the feature that the concentration of chemicals is adapted to reduce the silt loading to a substantially predetermined level or by a substantially predetermined percentage. For example, the silt-loading of the water is measured continuously or intermittently and said concentration is adjusted accordingly. Even if in a given situation only a percentage of silt is removed, the life of a storage dam may be lengthened in the same proportion. This may be more appropriate from a practical point of view than to endeavour to remove substantially all the silt by the use of larger concentrations and/or more effective choices of chemicals and/or more refined or complicated equipment.

An advantage of the specific reagents disclosed above, is that they adhere to the agglomerated silt particles formed, and are therefore removed at least in part from the purified water product when the agglomerated material is removed by flotation. As a result of this feature undue contamination of the purified water produced by these reagents is avoided or mitigated.

A further important aspect of the invention is that the reagents disclosed above are known to be substantially non-toxic, especially when used in such low concentrations as envisaged in accordance with the invention. As will emerge from the examples which follow below, the invention envisages the use of the various reagents in extremely low concentrations; this aspect, taken in combination with the above-mentioned feature that the reagents tend to adhere to (and will accordingly be removed with) the agglomerated silt particles, virtually eliminates any possible risk of toxic contamination of the water.

The following serves to exemplify typical reagent systems for the purposes of the invention.

| Component | REAGENT SYSTEM "A" | | |
|---|---|---|---|
| | Typical amount (g) | Concentration weight in mixture | Approximate range of suitable concentrations in mixture |
| "Oleic acid 6677" (flotation grade) | 10g | 87% | 70-93% |
|  | 0,3g | 2,6% | 1-5% |
| "Dow Seperan" AP 273 Cationic polyacrylic amide | 0,7g | 6,1% | 4-10% |
| "E 1727 (Hoechst) Alkane sulphonate | 0,5g | 4,3% | 2-8% |
| "Hoechst product 1175" | | | |

| REAGENT SYSTEM "A" | | | |
|---|---|---|---|
| Component | Typical amount (g) | Concentration weight % in mixture | Approximate range of suitable concentrations in mixture |
| | 11,5g | | |

The above mixture by high speed agitation is converted into an emulsion or solution or mixture of both in 300 ml of water, of which generally speaking, 12–20 ml are employed for the treatment of 5 liters of silt-containing water.

It was observed in practice that the incorporation of Hoechst Product 1175 in the mixture resulted in an occasional improvement regarding the ease of removal of silt particles.

| REAGENT SYSTEM "B" | | | |
|---|---|---|---|
| Component | Typical amount (g) | Concentration weight % in mixture | Approximate range of suitable concentrations in mixture |
| "Oleic acid 6677" (floatation grade) | 10.1g | 91.81% | 70–93% |
| Polyethylenimine "PEI 1000" | 0.5g | 4.55% | 1–10% |
| High protein substance "Protease-Hoechst 1549/1" | 0.3g | 2.73% | 0,5–6% |
| Cationic polyacrylic amide "Hoe E 1727" | 0.1g | .91% | 0–10% |
| | 11.0g | | |

The above mixture by high speed agitation is converted into an emulsion or solution or a mixture of both in 150 ml water, and is further diluted to 400 ml. Of this diluted reagent system, about 8 ml is employed for the treatment of 5 liters of silt-containing water. The method according to the invention may be applied in a continuous manner, such as to remove silt from the flowing water of rivers or other inlet sources before passing through the feed inlet(s) of lakes or dams. Alternatively, the method may be applied in batch-wise operation, such as to remove the silt sediment deposited on the beds of lakes or dams.

In the former case, the silt-removal may conveniently take place within the river or other inlet conduit, and a part of the river or inlet conduit may serve as the conditioning area where the necessary reagents are introduced, an adjacent part normally further downstream may serve as the flotation area where air under pressure may be introduced, and yet another part, again normally further downstream, may serve as the recovery area where the silt-bearing scum may be collected and removed.

It has also been observed that in certain instances the agglomerated silt and/or the foam produced with the aid of the chemicals has an affinity for dissolved mineral matter such as metal ions. When this happens, it is usually desirable.

In a preferred embodiment of the apparatus, the means adapted to feed and mix chemicals may comprise feed pipes equipped with feed nozzles, associated with turbulence inducing obstructions appropriately positioned and distributed across a flow path of the water to be de-silted. Furthermore, the means adapted to bubble air may comprise a structure downstream of the means adapted to feed and mix chemicals, across and along the bottom of a flow path of the water to be de-silted, said structure incorporating air feeding and distributing passages, fed by suitable air pumping means and terminating in outlet apertures adapted to release air into the water in the form of bubbles. The means for removing the silt particles which have floated to the surface may be provided downstream of the means adapted to bubble air, and may take the form of a weir across the surface and upper region of the flow path of the water, the top of the weir forming an overflow edge leading into a sludge removal gutter, at least one passage for the desilted water being provided in the lower region of the flow path.

For the continuous operation of the method, a plant may thus be provided within a river or other conduit, which includes introduction and dispersal means, air bubble formation means and scum collecting means, preferably arranged in that sequence in a downstream direction. More particularly, such apparatus may comprise an apertured structure arranged across the flow path of the water and adapted for the water to pass through it in such a manner that turbulence is created, the apertured structure further having feed means for introducing the necessary flocculation and flotation reagents into the water; a compressed air supply system adapted to introduce pressurised air bubbles into the water to effect flotation of the agglomerated silt particles; and scum removal means for removing the silt-bearing scum. The latter means may comprise a weir suspended across the flow path of the water and so arranged that purified water will pass underneath it while scum-carrying water will flow over its top, a scum collecting gutter system being provided to collect and remove the scum.

If desired or required the gutter may include appropriate conveyor means, e.g. screw, scraper or bucket conveyor means for forwarding the sludge along and/or from the gutter. These and any other operative parts of the apparatus may be driven by energy supplied by the water flowing through the apparatus.

For that purpose the apparatus may comprise, e.g. in a manner substantially known per se, means for recovering energy from the water being de-silted. These means may include water wheels or turbines. The apparatus may thus be partly or wholly self-sufficient in its energy requirements. The transmission of energy to the operative parts may be mechanical or electrical.

The silt collected in this manner may be dried and treated further for use, such as for agricultural purposes. On the other hand, the water which flows into the lake or dam will be substantially silt-free or of substantially lowered silt content. In some cases, further purification of the water may be necessary, i.e. to remove any remaining flocculating and/or flotation reagent(s) to render the water suitable for domestic, agricultural and industrial use. However, in many cases no such further purification will be necessary, namely where careful selection of the reagent(s) takes place and where the minimum effective concentrations of the reagent(s) are used, as described above.

As was indicated earlier on in the specification, it is an important object of the invention to recover the silt from silt-containing water, particularly from rivers in flood during the rainy season, or after heavy downpours. It is an accepted fact that the silt which is swept away from the lands every year represents a substantial loss of fertility of the soil, and the reclamation of such silt for the purpose of upgrading impoverished soil constitutes an exceedingly beneficial aspect of the invention. The recovered silt may be transported to different localities for example by being pumped and/or conducted by gravity as a sludge onto agricultural lands on areas to be reclaimed as agricultural or horticultural lands.

By way of experimentation, an analysis was carried out on a number of representative samples of the sediment deposited in the Vaal Dam in the Republic of South Africa. The Vaal Dam is fed by the Vaal River which flows mainly through semi-arid areas which have a summer rainfall season with fairly heavy downpours at various intervals during the season. Comparable situations would exist in the United States of America and many other countries.

Three sediment samples were analysed in respect of particle size distribution, and the cation content, cation exchange capacity and base saturation. The results are set out in Tables I and II below, and the samples are code referenced as follows:
Sample V:Earlier Vaal Dam sediment
Sample VV:Recent Vaal Dam sediment
Sample VK:Sediment taken from the locality where the Klip River flows into the Vaal River.

TABLE I

| | Particle Size Analysis | | | | |
| --- | --- | --- | --- | --- | --- |
| | | | | Sand | |
| Sample | % Silt | % Clay | Fine | Medium | Coarse |
| V | 21,0 | 41,0 | 36,2 | 0,8 | 1,0 |
| VV | 16,0 | 37,0 | 45,2 | 1,6 | 0,2 |
| VK | 21,0 | 47,0 | 25,8 | 3,8 | 2,4 |

TABLE II

| | Analysis of Cation Content | | | | | | | | | | |
| --- | --- | --- | --- | --- | --- | --- | --- | --- | --- | --- | --- |
| | | | | | pH | | | | | Base sa- | |
| Sample | K | Ca | Mg | Na | KCl | H$_2$O | P | C.E.C | S-Value | turation | Toxic Al |
| V | 375 | 9250 | 1420 | 69 | 7,4 | 8,0 | 4 | 23,5 | 58,9 | >100 | 0 |
| VV | 250 | 9130 | 1180 | 112 | 7,3 | 7,9 | 7 | 21,0 | 47,6 | >100 | 0 |
| VK | 400 | 9000 | 1420 | 156 | 7,3 | 7,9 | 11 | 23,7 | 58,4 | >100 | 0 |

The following is to be noted:
1) K, Ca, Mg, Na, P and Al are expressed as parts per million available to plants, i.e. plant nutritious value.
2) C.E.C. (sometimes referred to as T-value) is the cation exchange capacity of the soil. (Na$^+$, K$^+$, Ca$^{++}$, and Mg$^{++}$ are referred to as exchangeable bases). The sum total of Na$^+$, K$^+$, Ca$^{++}$ and Mg$^{++}$ expressed as milli-equivalent percent, constitutes the S-value. These accordingly constitute portion "S" of the exchangeable cation capacity while "T" indicates the entire exchange capacity. The difference between T and S is constituted by exchangeable H$^+$
3) Base saturation % $= \frac{\text{S-value}}{\text{T-value}} \times \frac{100}{1}$ $= \frac{\text{S-value}}{\text{C.E.C.}} \times \frac{100}{1}$ 4) It should be noted that the silt samples reflected above are super-saturated with cations; the base saturation is reflected as >100%. These results are also indicative of the electrical charges on the silt particles.

From the figures set out in Table II, the nutritious value of the sedimented silt and accordingly the value thereof for agricultural and horticultural purposes, is evident.

The scope of the invention extends to silt thus recovered, with or without further processing and to agricultural or horticultural land reclaimed or upgraded with silt as herein described.

The plant provided for carrying out the method should advantageously be designed to be capable of adjustment in relation to the variables which would influence the practical operation, such as the rate of water flow; the silt concentration per unit volume of water; the surface and other characteristics of the silt; the particle size distribution of the silt; the seasonal variation of silt concentration; etc. etc. Apparatus and methods for measuring silt contents of water are known per se and do not require description.

As already indicated for satisfactory operation it is not necessary for the apparatus to be capable of adjustment to provide for the extreme possible limits of the variables, e.g. to provide for the treatment of the entire volume of water in a weir or stream during excessive floods. Thus, at the locality where the plant is to be erected, a by-pass system may be provided so that a portion of the water may be fed to by-pass the de-silting space and only a portion of the water will enter into and be treated within the de-silting space. Adjustable feed means may be provided to regulate the relative rates of water flow through the by-pass and into the de-silting space. Desirable relative flow rates may be determined in advance, with reference to such factors as average flow rates, average silt-loading, flood silt-loading, desirable levels of silt-removal, etc.

In the case of batch-wise operation in accordance with the invention, a plant for carrying out the method may comprise an apparatus adapted to be lowered onto the bed of a lake or dam and having disperser means adapted to be advanced progressively into the sedimented silt on the bed of the lake or dam, the disperser means further having a plurality of reagent feed openings for supplying the flocculating and flotation reagents and a plurality of compressed air supply nozzles for liberating air bubbles; the arrangement being such that the advancing disperser means will create turbulences of the sedimented silt and water, to enhance the flocculation and flotation of the silt particles. Scum collecting and removal means may be provided at a suitable locality, e.g. at the overflow of the lake or dam for collecting and removing the silt-bearing scum.

The invention and the manner in which it may be carried out will now be described further by way of example based on laboratory experiments conducted by the applicant.

EXAMPLE 1

Fine-grained soil, obtained from top-soil samples, is admixed with water at a rate of 2.27 g soil/l water to simulate silt-containing water. A simultaneous flocculating and flotation reagent is prepared by admixing 10.0 g "oleic acid 6677 special flotation grade" 3.0 g "Hoe E 1727" flocculating agents, and 0.2 g "Protease-Hoechst 1549/1" with 200 ml water, and stirring the mixture with a high rotation speed stirrer until a stable white emulsion is formed, which is then made up to 300 ml 4725 of the simulated silt-containing water is flocculated and flotated in a Denver Sub-A laboratory flotation machine with a 4½ liter flotation cell, by the addition of 20 ml of the prepared emulsion. No additional emulsion is required to achieve successful flotation of the silt. The conditioning period is 1 minute and the flotation period is 2 minutes. The silt recovery is 100% for all practical purposes.

EXAMPLE 2

The procedure of Example 1 is repeated, but with a simulated silt-containing water supply provided by adding 12.4 g soil/l water. After a conditioning period of 2 minutes and flotation period of 2 minutes, 100% silt is recovered for all practical purposes.

EXAMPLE 3

Simulated silt-containing water is provided by adding to water 10 g silt/l water. A flocculating and flotation reagent is prepared by thoroughly admixing 10.0 g "oleic acid 6677 special flotation grade," 0.3 g "Dow Seperan AP 273," 0.7 g "Hoe E 1727" flocculating agent, and 0.5 g of the Hoechst alkane sulphonate "Product 1175." The admixture is made up to 300 ml with water and stirred with a high rotation speed stirrer until a stable white emulsion is formed. 4000 ml of the simulated silt-containing water is flocculated and flotated by the addition of 15 ml of the prepared emulsion. After a conditioning period of 2 minutes and a flotation period of 2 minutes, 100% silt recovery is achieved for all practical purposes.

It should be understood that the relative quantities of reagents given above are by way of example only. In practice, the relative quantities may be varied to obtain a reagent best suited to the treatment of a particular body of silt-containing water.

EXAMPLE 4

Simulated silt-containing water is provided as in Example 3. A flocculating and flotation reagent is prepared by thoroughly admixing 10.1 g "Oleic acid 6677 special flotation grade," 0.5 g "PEI 1000" (i.e. high molecular weight polyethylenimine), 0.3 g "Protease-Hoechst 1549/1," and 0.1 g "Hoe E 1727." 150 ml water is added, and the admixture is stirred with a high rotation speed stirrer (about 7000 rpm) until a stable emulsion is formed, which is further diluted to 400 ml. 5 l of the silt-containing water is treated with 8 ml of the prepared reagent in a Denver Sub-A Laboratory flotation machine with a 5 l cell. After a conditioning period of 2 minutes, flotation is applied and 100% silt removal is achieved with the recovery of completely pure water.

EXAMPLE 5

Further examples of flotation/agglomeration reagents for removing silt from river water (A) Oleic acid 10 g, dextrin 0.5 g, totanin 0.5 g HOE E 1727 1.0 g diluted to 300 ml with water. Mixed properly as described.

(B) Oleic acid 10.0 g (83.3% w/w), HOE E 1727 1.5 g (12.5% w/w) Protease (Hoechst 1549/1) 0.5 g, (4.17% w/w), diluted to 300 ml with water. Mixed properly as described.

(C) Oleic acid (flotation grade) 80–90%
  Hoe E 1727 20–10%

(D) Heat a solution of "Jaguar M 700-X" (Stein Hall) until it forms a black mass-Add "Hoechst Phosocresol B" (a cresilic acid product). Heat in aqueous solution until acidity is neutralised. Add Hoechst HOE E 1727. Mix thoroughly, dilute. Analytical method for detecting reagent (B) in water:
  (i) add between 20 and 40 ml 5% $CuSO_4$ solution to 300 ml clean water sample, mix, add 10–20 ml secondary butyl Xanthate. Sky-blue colour.
  (ii) Repeat procedure after adding 1 ml reagent B to water. The colour will be grass green.

The above examples will serve to calculate the amounts of reagents to be used on a large scale and the proper spacing of the various integers of the apparatus in accordance with a given flow rate of water in order to provide the required time intervals. Adjustments are possible by single experiment.

The contents of the claims are to be considered a part of the present disclosure.

Figure 1:
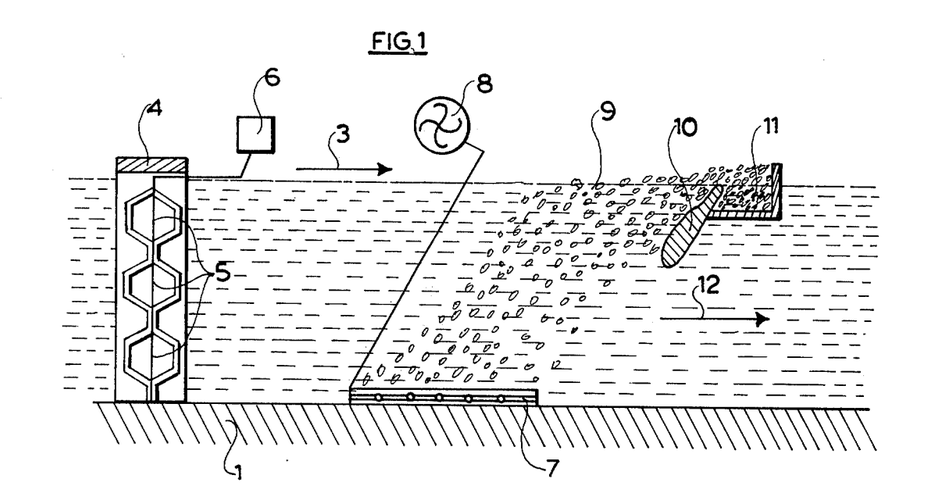
FIG. 1 represents a vertical section taken longitudinally through a portion of a river including apparatus in accordance with the invention and FIG. 2 illustrates diagrammatically in plan view the layout of another embodiment of an apparatus in accordance with the invention.

Referring to FIG. 1, 1 represents the river bed, 2 the water surface of the river and 3 the direction of flow of the river. The section of river illustrated precedes a storage dam which is not illustrated. On the upstream side at 4 there is provided a grid-like concrete structure extending across the river, the grid itself 5 being constructed largely of concrete with a pipe matrix in the concrete. This structure performs a double combined function. Firstly the pipes are provided with dispersal nozzles (not specifically illustrated) adapted to feed flocculating and flotation reagent(s) in a finely dispersed form into the water, the reagents being supplied by a pump 6. In addition the grid-like structure is arranged in such a manner that it induces turbulence in the water, flowing through the grid, to promote intimate admixture of the chemicals. Thus the pipe matrix is an integral part of the concrete grid 4. In the present example a single grid device 4, 5 is provided. However, where it is desired to introduce different chemicals successively, it is of course possible to provide a corresponding succession of such grids 4, 5 across the river bed at suitable intervals. In down-stream direction the grid 4, 5 is followed by an air bubble forming device 7 in the form of a concrete slab across the river bed, including air dispersion means such as pipes with air nozzles to which air under adequate pressure and in adequate volume, is supplied by an air blower means 8. If necessary, precautions are taken to prevent clogging of the air nozzles, e.g. by algae growth. This may be achieved by the provision of cleaning devices which do not form part of the present invention and/or by setting the air flow to a value at which a self-cleaning action of the nozzles is experienced. The pressure and feed rate produced by the blower device 8 are adjusted such that a satisfactory dispersion of air bubbles and bubbling rate is produced to carry the flocculated or agglomerated slime particles to the water surface 2 carried by foam bubbles 9 which drift along the water surface further downstream towards the skimming device 10. The skimming device 10 takes the form of a weir-like object, preferably inclined as shown extending across the water surface on the downstream side of which there is provided a foam gutter 11. The angle and level of the device 10 are so adjusted that the foam 9 overflows over the device 10 into the gutter 11 from where the foam is withdrawn (e.g. assisted by mechanical means which are not shown) towards sludge recovering means on the river bank (not illustrated). If desired or required, the overflow of the foam 9 over the means 10 into the gutter 11, may also be assisted by mechanical scooping or scraping means which are not illustrated. The arrow 12 represents the flow of purified water underneath the weir device 10.

The foam collected in gutter 11 may be allowed to separate on its own or assisted by treatment known per se, so as to remove therefrom the water which (if necessary after further purification) may be returned to the purified water stream 12, or may be used separately. Agglomerated silt recovered from the foam, is conveyed, e.g. for being spread onto agricultural fields. If desired or required, the silt recovered may be subjected to further treatment, e.g. to improve its soil characteristics and/or to recover flotation or agglomeration chemicals therefrom.

It will be appreciated that the optimum distances in the direction of flow between items 4, 5 and 7 on the one hand, and items 7 and 10, 11 on the other hand, are functions of the times required for the reagent introduced at 4,5 to agglomerate the silt particles and condition them for flotation and the time required for the froth carrying the silt particles to rise to the surface and also of the flow rate of the water. Because the flow rate of a river is variable, these distances must either be large enough to allow for maximum flow rates, or the distances must be adjustable, namely by certain of these items being movable up or downstream and being adapted to be anchored or fixed in such adjustable positions. It should also be appreciated that if the means illustrated are installed across a substantially natural river bed, allowance will have to be made for the variations in width of the river depending on the amount of water carried at any given time. For example, in the case of the means 10, 11, it would be necessary to provide these in separate sections movable relative to one another. Because that is somewhat inconvenient, it is considered preferable to canalise the river bed in that section of the river where treatment is to take place, and to provide the river bed with substantially vertical banks. In that case the width of the river will not change, but only its depth.

Figure 2:
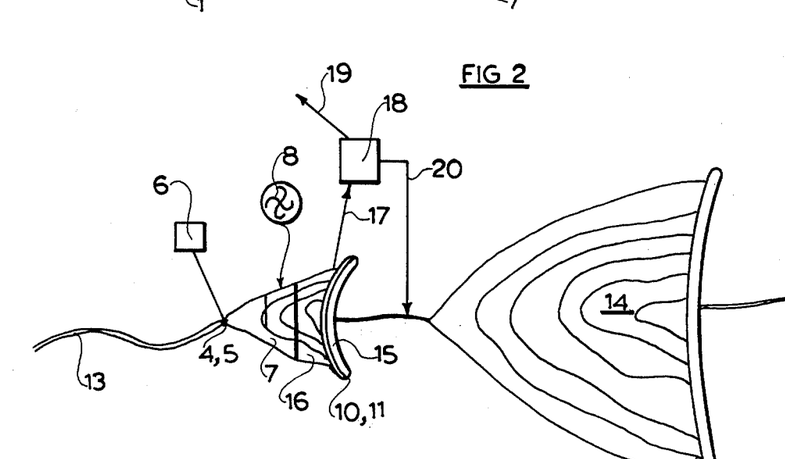

Referring now to FIG. 2, the installation there illustrated diagrammatically is a modification of the means shown in FIG. 1 and serves to counteract in certain respects the variables resulting from changing flow rates of the river. In FIG. 2 a river 30 flows towards the storage dam 14. A permanent dam wall 15 is built across the river at a locality upstream of the dam 14. This dam wall 15 which is comparatively small, and provided with sluice gates (not illustrated) serves to dam up a body of water 16 which by appropriate adjustment of the sluice gates is maintained at a substantially constant level. The means 4, 5 and feed pumps 6 are provided at the upstream entrance to that body of water 16. Intermediate between the means 4, 5 and the dam wall 15, the air bubbling means 7, 8 are provided across the bed of the body of water 16. The means 10, 11 form a permanent part of the dam wall 15, sludge pump system means 17 serving to convey foam and sludge to the separating plant 18 from where recovered silt 19 is passed on to the fields and recovered water 20 is recycled to the stream or purified for domestic purposes.

Figure 3:
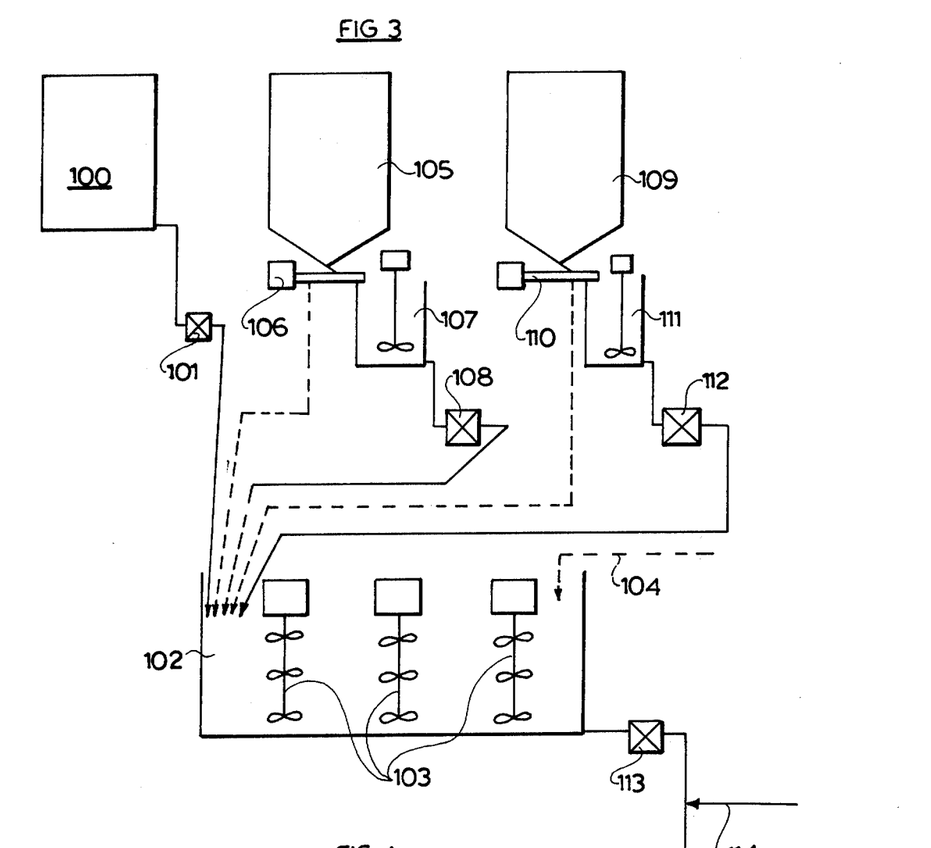
FIG. 3 represents a flow sheet of the chemical supply for an embodiment of an apparatus in accordance with the invention.

Referring to FIG. 3, 100 represents a bulk storage vessel for unsaturated fatty acids which, through a feed pump 101 feeds into a mixing vessel 102 equipped with high frequency stirrers 103 into which, if desired, water may be added at 104. 105 represents a bulk container for flocculant in powder and/or liquid form which feeds into the mixing vessel 102 either by means of a vibration feeder 106 directly (dotted arrow) or if desired or required, through a pre-mixing vessel 107 with stirrer followed by a feed pump.

109 Represents the hopper for the reagent "Protease," similarly feeding by means of a vibration feeder 110 either directly into the mixing vessel 102 (dotted arrow), or through a pre-mixing vessel 111 with a stirrer and water inlet followed by a feed pump 112. The mixing vessel 102 feeds into the means in accordance with FIGS. 4 to 6 with the aid of a diaphragm pump 113. The reagent solution may be diluted further if necessary with water introduced at 114.

Figure 4:
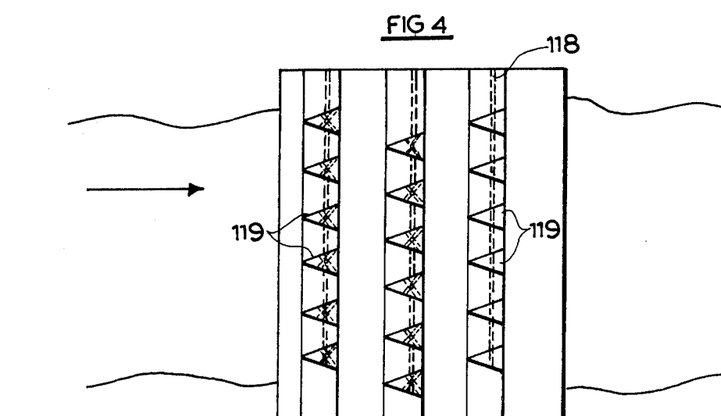
FIGS. 4, 5 and 6 represent respectively a plan view, a side elevation and a front elevation (all partly sectionalised) of an embodiment of the means for distributing the chemicals into the water.
Figure 5:
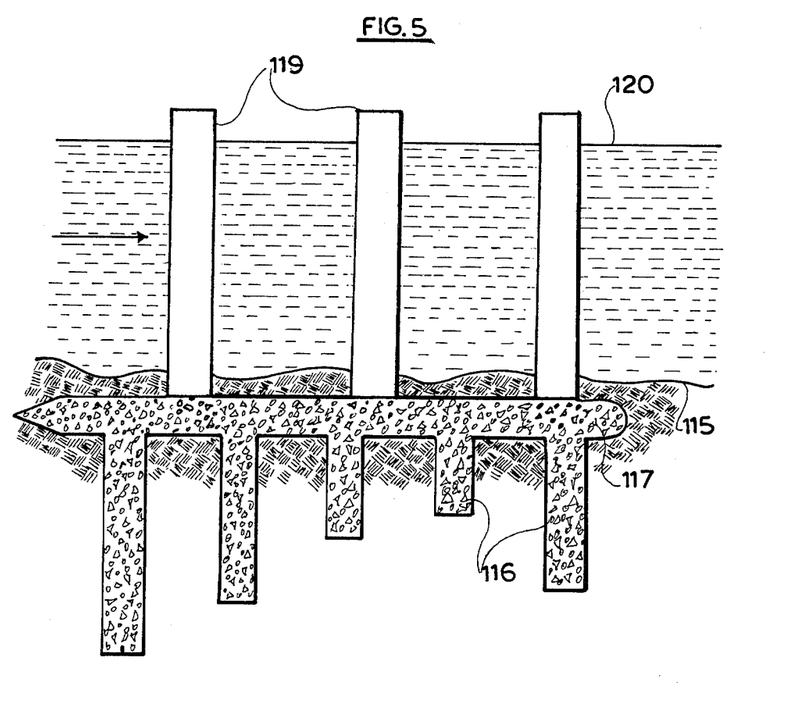
Figure 6:
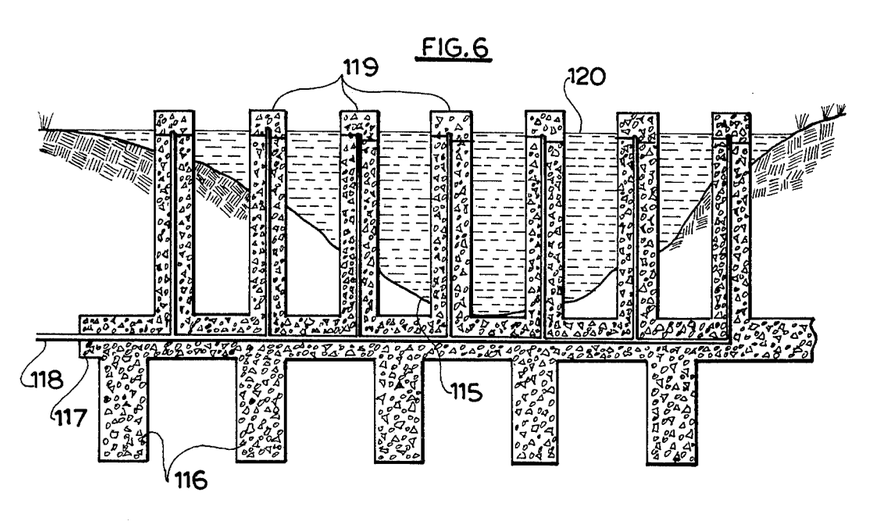

FIGS. 4 to 6 represent an embodiment slightly different from that shown in FIG. 1 of a means for intimately dispersing the chemicals in the river water. Appropriately anchored in the river bed 115 by means of foundation pillars 116, there is a reinforced concrete foot plate 117 accommodating the main chemicals supply line or lines 118. From the foot plate 117 a plurality of vertical pillars 119 extend upwardly to above water level 120. These pillars 119 are of triangular profile, the apex of the triangle being directed upstream. They are set up in this example in three rows in a staggered pattern. Reagent feed lines 120a extend upwards inside these pillars, each being provided with a large number of nozzles suitably distributed along the length of each pillar to supply the reagents as evenly as possible to the river water. The pattern and profile of the pillars 119 is so designed as to induce turbulence in the wake of each pillar.

Figure 7:
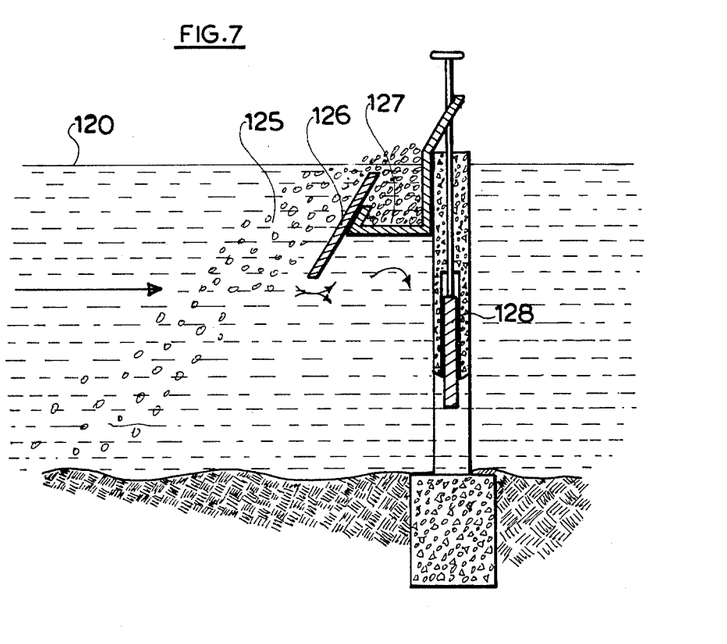
FIG. 7 represents a vertical section of the silt removal gulley and associated means in an embodiment of an apparatus in accordance with the invention and FIG. 8 represents a plan view of the means in accordance with FIG. 7 and in addition a block diagram of an embodiment of silt recovery means.
Figure 8:
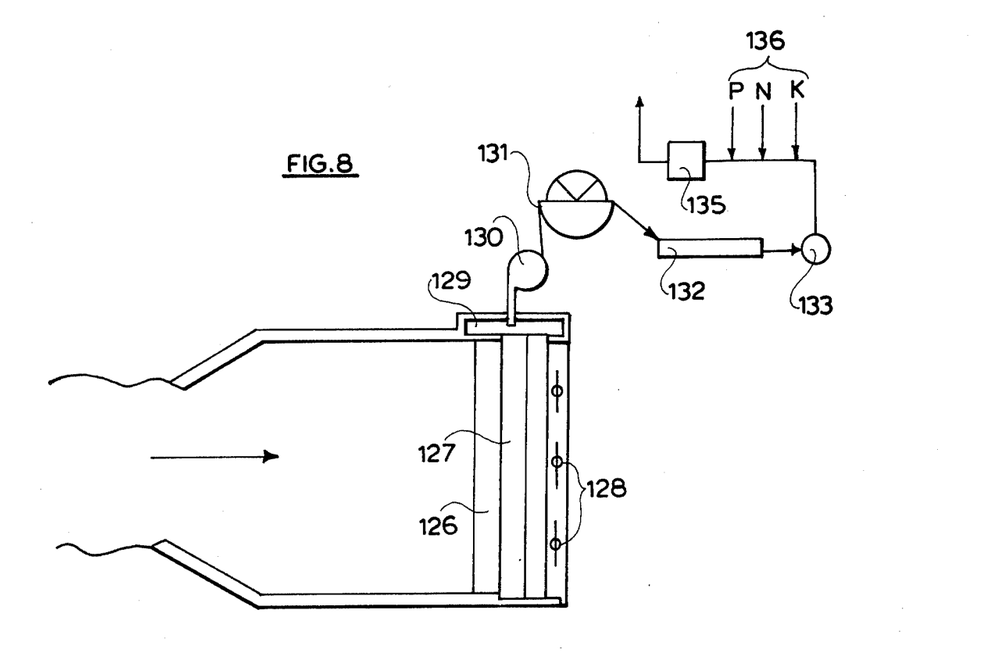

Referring to FIGS. 7 and 8, the aggregated silt 125 rises to the water 120 with the air bubbles and is skimmed off due to the action of the river flow by the overflow weir 126, and enters the gulley 127. The gulley 127 is associated with a set of sluice gates 128 automatically or manually adjustable to maintain a reasonably constant water level behind the weir 126. The purified water flows onwards along the river bed underneath the weir 126 and underneath the partly opened sluice gates 128. In the present example a minor difference in water head between the two sides of the sluice gates is assumed, permitting a comparatively light construction. Conventional dam wall types of construction may be resorted to, to withstand any desired pressure head. This would be particularly appropriate if it is desired to utilise this head to drive a turbine to provide the energy requirements of the system.

Obviously it would also be possible to provide mechanical skimming means for scooping up the floated scum.

Referring particularly to FIG. 8, it is assumed in the present case that the gulley 127 discharges by gravity into a launder 129 from which a sludge pump 130 feeds the silt into a concentrating means 131, e.g. a disc filter. The separated silt from there passes into a drying plant 132, from there into a hopper 133, to be mixed at 135 with fertilizer concentrates 136, whence the product may be bagged as an enriched soil or as a low grade fertilizer.

What is claimed is:

1. A method for removing silt particles from a natural flow of water having a substantial concentration of natural, essentially inorganic silt, which comprises:
   (a) essentially non-specifically, with the aid of a chemical agglomerating agent, agglomerating at least a major portion of the silt particles to form the same into agglomerated particles of substantially increased size,
   (b) hydrophobically treating the agglomerated particles, essentially in a non-specifically manner, whereby the same are imparted with hydrophobic properties,
   (c) preventing settling of said treated particles by bubbling air through the water thereby floating the agglomerated particles to the surface of the water, and
   (d) removing the floated agglomerated particles.

2. A method as claimed in claim 1, wherein the agglomeration step to agglomerate the silt particles and the hydrophobic step for imparting hydrophobic properties are carried out simultaneously.

3. A method as claimed in claim 1, carried out on the water of a river or stream in a succession of treatment zones through which the water flows sequentially, provided in a flow path of such river or stream.

4. A method as claimed in claim 3, carried out at a locality stream upward of a water storage dam.

5. A method as claimed in claim 3 which comprises intermittently mixing into the flowing water of the river or stream in a first treatment zone in the flow path of the river or stream, silt agglomerating chemicals to agglomerate the silt particles so as to form same into the agglomerated particles of substantially increased size and chemicals to impart hydrophobic properties to the particles thus being agglomerated; bubbling air through the water in a second treatment zone at a locality downstream of the first treatment zone to achieve flotation of the agglomerated particles; and skimming off the floated particles in a third zone at a locality downstream of the second zone.

6. A method as claimed in claim 5, wherein the concentration of chemicals is selected in accordance with the silt-loading of the water.

7. A method as claimed in claim 6, wherein the concentration is adapted to reduce the silt-loading to a predetermined level of incomplete removal.

8. A method as claimed in claim 6, wherein the silt-loading of the water is measured continuously or intermittently and the concentration is adjusted accordingly.

9. A method as claimed in claim 3, which is carried out on a portion of the water of the river or stream, while another portion of the water remains untreated.

10. A method as claimed in claim 1, wherein the agglomeration step comprises introducing into the water a suitable concentration of chemicals including a polyacrylic amide flocculating agent.

11. A method according to claim 1, wherein the step of hydrophobically treating comprises introducing into the water an unsaturated fatty acid.

12. A method according to claim 11, wherein the fatty acid is oleic acid or another member of the oleic acid series.

13. A method as claimed in claim 2, wherein the agglomeration and hydrophobic treatment steps are carried out simultaneously by introducing into the water a combination of chemicals including a polyacrylic amide and an unsaturated fatty acid.

14. A method as claimed in claim 13, wherein the polyacrylic amide and the fatty acid are intimately mixed to form a stable emulsion prior to the introduction into the silt-containing water.

15. A method as claimed in claim 14, wherein the polyacrylic amide is subjected to shearing during the mixing with the fatty acid.

16. A method as claimed in claim 13, wherein the chemicals include a flocculant consisting of polyacrylic amide polymer blocks linked together by acrylic acid salt groups.

17. A method as claimed in claim 13, wherein the chemicals include an alkane sulphonate floatation reagent.

18. A method as claimed in claim 13, wherein the chemicals include a flocculant consisting of a polyalkylenimine.

19. A method as claimed in claim 18, wherein the flocculant consists of polyethylenimine.

20. A method as claimed in claim 13, wherein the chemicals include also Protease-Hoechst 1549/1.

21. A method as claimed in claim 2, wherein the agglomeration and hydrophobic treatment steps are carried out by introducing into the water a suitable concentration of chemicals including a polyacrylic amide and an unsaturated fatty acid of the oleic series, together with one or more of the following substances: Protease-Hoechst 1549/1; an alkane sulphonate; a substance consisting of polyacrylic amide polymer blocks linked together by acrylic acid salt groups; and a polyalkylenimine.

22. A method as claimed in claim 1, wherein the silt removed from the water is recovered as agricultural or horticultural soil.

* * * * *